Aug. 10, 1926.
C. E. STAHL
1,595,580
SPROCKET CHAIN STRUCTURE
Filed Jan. 14, 1924
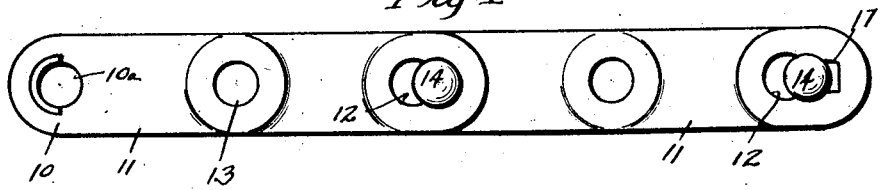
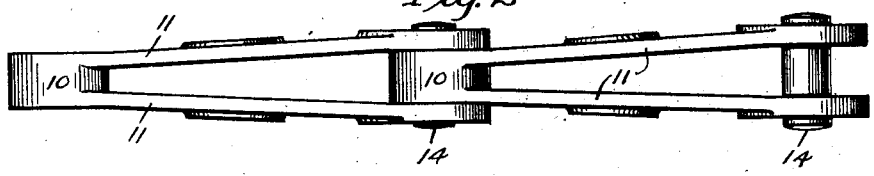
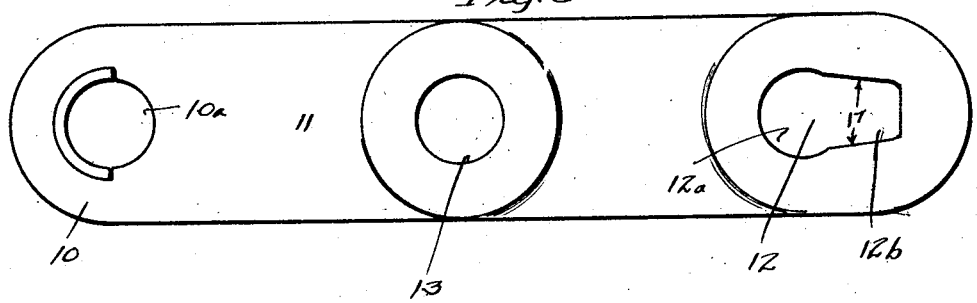
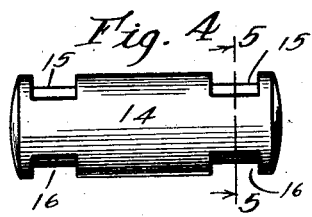
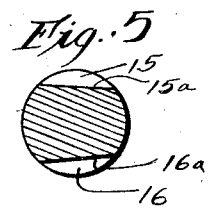
Inventor
Charles E. Stahl
By Bair & Freeman Attys.
Witness
Lynn Latta Patented Aug. 10, 1926.

1,595,580

UNITED STATES PATENT OFFICE.

CHARLES E. STAHL, OF NEWTON, IOWA, ASSIGNOR TO THE PARSONS COMPANY, OF NEWTON, IOWA.

SPROCKET-CHAIN STRUCTURE.

Application filed January 14, 1924. Serial No. 685,964.

The object of my invention is to provide a sprocket chain structure of simple, durable and inexpensive construction.

More particularly, it is my object to provide a sprocket chain structure in which each link forms a single complete unit like every other link, whereby cost and complexity of manufacture is reduced to a minimum.

An additional object is to provide such a chain structure having novel means for connecting together the successive links in such manner that there will be no play between the links likely to cause such wear as will further increase such play.

Still another object is to provide such a chain structure so made as to insure long life.

Another purpose is to provide in such a structure link connections with practically no lateral projections.

With these and other objects in view, my invention consists in the construction, arrangement and combination of the various parts of my sprocket chain structure, whereby the objects contemplated are attained, as hereinafter more fully set forth, pointed out in my claim, and illustrated in the accompanying drawings, in which:

Figure 1 shows a side elevation of two links of a chain structure embodying my invention.

Figure 2 shows a top or plan view of the same.

Figure 3 shows a side elevation of one link.

Figure 4 shows a front elevation of the pintle pin used with my chain structure; and Figure 5 shows a sectional view of the pintle pin taken on the line 5—5 of Figure 4.

My improved standard link consists of a journal portion at one end indicated in the drawings herewith by the reference character 10 from which project the slightly diverging arms 11, having at their free ends the registering key-hole slots 12.

The key-hole slot has at its end adjacent to the journal 10 the portion 12$^a$ substantially cylindrical in outline, except where it communicates with the narrow portion 12$^b$ of the slot. The upper and lower walls of the portion 12$^b$ converge slightly toward each other, as shown in Figure 3, so that such narrow portion 12$^b$ is slightly tapering.

The arms 11 are provided midway between their ends with registering openings 13 for receiving pintles or the like on excavating buckets.

The arms 11 of each link are spread apart just far enough to snugly receive between them the journal portion 10 of the next link. The successive links are connected together by pins 14, which are in general cylindrical in form, having near their ends upper and lower slots 15 and 16.

The bottoms of said slots, as at 15$^a$ and 16$^a$, illustrated in Figure 5, are slightly inclined from the parallel to fit the portion 12$^b$ of the key-hole slots and to engage snugly therein before the pin reaches the extreme ends of the portions 12$^b$, so that when the slots 15 and 16 receive the opposite walls of the key-hole slot portion 12$^b$, the pin will tend to wedge into place, and in case of wear can be drawn more tightly into wedged position by the tightening of the chain.

This is a matter of importance, which will be referred to a little later herein.

In assembling the links in the chains, the portion 10 of one link is placed between the arms 11 of another link, as illustrated in Figures 1 and 2.

The pin 14 is inserted through the portions 12$^a$ of the key-hole slots and through the opening 10$^a$ in the journal 10 and the links are pulled away from each other until the substantially flat bottoms of the slots 15 and 16 slide into the portions 12$^b$ of the key-hole slots and wedge against the walls thereof.

Each link forms a complete unit in itself exactly like every other link in the chain, which reduces the cost of manufacture and the cost of keeping repairs in stock.

The sprocket tooth engages the journal portion 10 and operates upon the link of which that portion is a part and drops on the next link with a minimum tendency to shear.

I will now refer to the advantages in the peculiar shape of the portion 12$^b$ of the key-hole slot.

It is well-known that in large sprocket chains, the pin or other member which connects the links is liable to become worn or to wear the links, so as to leave substantial play in the chains.

Especially, there is a tendency to widen in the direction indicated by the arrows 17 in Figure 3.

When the link becomes worn in this manner, no chain tightener will be satisfactory in taking up the play. With the tapered portion 12$^b$ and the slots 15 and 16 with the peculiar shape, as illustrated in Figure 5, it will be seen that any wear in the direction indicated by the arrows at 17 can be taken up by simply tightening the chain. Therefore, with my improved chain, there is less likely to be undesirable play after the chain has become worn.

It will be noted that the pins 14 do not rotate in their slots but that the next link turns on the central portion of each pin. This causes less wear than when the narrow arms wear on the pins.

In the journal portion 10, I have provided a half bushing 10$^b$ for the central portion of the pin 14 to bear against. As a load on the chain causes a tendency for the links to pull away from each other, the wear will come on only one side of the opening 10$^a$ and only that side requires a bushing as indicated in Figures 1 and 3. When, after long use the links are worn at the pivots, these bushings 10$^b$ or the pins 14 may be easily renewed.

The links are narrow and the pins have no projecting parts and the buckets therefore need not be built to cut beyond the links.

There are no cotter pins to shear.

It will, of course, be noted that there are no projecting parts on the pintle or pin and no cotter pins or the like are used for holding them in place.

I claim as my invention:

In a chain structure of the class described, a link having a journal member at one end and having extending therefrom slightly diverging arms provided at their ends farthest from the journal member with key-hole slots, the walls of the narrower portions of which are slightly diverging substantially as shown, and pins adapted to be received in said slots having near their ends upper and lower slots, the bottoms of which are shaped to fit the contour of the narrower portions of the key-hole slots and to wedge therein, spaced from the extreme ends of the slots, in an assembled chain.

CHARLES E. STAHL.